United States Patent [19]
Brown

[11] 3,927,259
[45] Dec. 16, 1975

[54] SIGNAL IDENTIFICATION SYSTEM

[75] Inventor: Robert M. Brown, Woodbridge, Va.

[73] Assignee: Atlantic Research Corporation, Alexandria, Va.

[22] Filed: Feb. 13, 1974

[21] Appl. No.: 442,237

[52] U.S. Cl. .............. 179/1 MN; 307/232; 328/109
[51] Int. Cl.$^{2}$ .......................................... H04M 3/22
[58] Field of Search.. 179/1 MN, 1 VC, 1 SP, 2 DP, 179/15 AS, 15 BF, 81 C, 84 L, 84 VF, 175.2 C; 324/77; 307/232, 236; 328/109, 110, 118, 120

[56] References Cited

UNITED STATES PATENTS

| | | | |
|---|---|---|---|
| 2,761,897 | 9/1956 | Jones | 179/1 VC |
| 2,974,281 | 3/1961 | Feldman | 179/2 DP |
| 3,448,215 | 6/1969 | Engel | 179/1 MN |
| 3,524,935 | 8/1970 | Gonsewski et al. | 179/2 DP |
| 3,767,860 | 10/1973 | Brown | 179/1 MN |

*Primary Examiner*—Kathleen H. Claffy
*Assistant Examiner*—Randall P. Myers
*Attorney, Agent, or Firm*—Finnegan, Henderson, Farabow & Garrett

[57] ABSTRACT

The embodiments of the signal identification system which are disclosed distinguish between signal conditions on a communication line, as for example, between noise and modulated data signals and between noise, modulated data, voice, and a no signal condition, and identify the particular type of signal condition present.

In a particular system embodiment disclosed for discriminating between noise and modulated data, a four-stage shift register is loaded with a pulse form of the input signal. The outputs of the shift register are repeatedly compared to see if the register contents match as the input signal is continuously clocked into the register. Since it was theorized that modulated data possesses a repetitious quality, a predetermined number of matches at the shift register outputs indicates the presence of modulated data on the communication line while the failure to attain this number of matches indicates the presence of noise.

42 Claims, 3 Drawing Figures

SIGNAL IDENTIFICATION SYSTEM

BACKGROUND OF THE INVENTION

The present invention relates to a system, for use with communication networks and systems, which discriminates or distinguishes between noise and modulated data signals.

It is often necessary or desirable to monitor a communication line to determine how and to what extent the line is being used. At audio frequencies, such as are used for the sending and receiving of telephone and data signals, the latter including telegraph signals within its scope, it is quite common to provide a customer with a line or circuit which is used for both voice and data communication needs. Because the charge or tariff is determined by the grade of circuit provided, and not necessarily the use of which such circuit is put, it results in an inefficient, as well as an expensive, practice to employ a data circuit when the transmissions are primarily voice. It is preferable, therefore, to be able to monitor the use to which a customer is putting his circuit and appropriately switch to a lower grade circuit if voice transmissions form most of communications.

Similarly, in the routing of audio signals, it is often required that the transmission be monitored at a communication center or terminal location and directed to a voice user or a data terminal, depending on whether voice or data, respectively, is on the line. While an operator can listen and manually perform the required switching, it leads to greater efficiencies and substantially eliminates the likelihood of error if the operator can be automatically informed of the type of signals which are being carried over his communication circuits. If desired, automatic switching or routing can also be performed. Additionally, the capability of being able to monitor automatically communications circuits leads itself readily to the continuous monitoring and the ability to make a recording of the utilization of the circuit for future reference, as well as traffic analyses.

In U.S. Pat. No. 3,767,860, issued Oct. 23, 1973, to Robert M. Brown, entitled "Modulation Identification System", and assigned to the assignee of the present application, there is disclosed a unique modulation identification system which distinguishes between voice and data signals in the communication line or whether there is an absence of signals — commonly known as the "no-signal" condition. As disclosed therein, the input signals, which have not been demodulated and therefore are in AC format, be they voice, data, or noise signals, are first shaped to provide a pulse train in which the edges of the pulses correspond to the zero-crossings of the input signals. The pulse trains are then processed to actuate the appropriate indicating circuit.

While the aforesaid system performs satisfactorily in distinguishing between input voice signals, data signals and a no-signal condition, it classifies a noise input as data. This classification of noise is at times acceptable, but an exact classification can be desirable and in some instances a necessity. Thus, there is a need to be able further to distinguish or discriminate between modulated data and noise.

The problem in attempting to distinguish between the two is that over a limited bandwidth, as might be encountered in a data communication network, the data and noise can have essentially the same energy spectrum. In fact, to the casual observer, the oscilloscope waveforms for noise and modulated data appear essentially the same.

Presently, the function of ascertaining whether a transmission is data or noise is being attempted in several ways. In one approach, human operators listen to the demodulated signals. This requires the hiring and training of additional personnel for a job that can hardly be considered stimulating from the standpoint of the operator. It would seen that the efficiency of the operators would be quite low. The act of listening might also become a violation of the privacy of the individuals or companies who are using the communication circuit.

Another approach using human operators is the visual analysis of oscilloscope waveforms. This requires special training of the operators and operating experience before becoming adept at determining what is a noise signal in contrast to what is one of the myriad modulated signals that could be present. It would seem that this approach would result in a costly and inefficient use of personnel. Yet another approach being developed is Fourier analysis of the complex waveforms. The details of this approach have been made known, and the complexity of the required mathematical anslysis will apparently require a computer dedicated solely to each analysis. The high cost of this approach is readily apparent, and the hardware limitations of currently available processing equipment may not allow satisfactory real time analysis.

SUMMARY OF THE INVENTION

The present invention overcomes the problems of the prior art by providing electronic apparatus which automatically discriminates between noise signals and modulated data signals on a real time basis using novel techniques unlike those of the prior art. Considered in its broadest aspects, it can be used where there is a need to know whether noise or modulated data is being monitored without regard for the intelligence content, or whether there is unwanted noise on the line, all without interruption of any communication in progress and without having to take the line out of service. The system can also be incorporated with other apparatus for analyzing signals, including but not limited to the system disclosed in the aforesaid U.S. Pat. No. 3,767,860, when additional information about the signal content is desired.

In the development of the present invention, it occurred that it might be possible to discriminate between noise and data if data was treated as being somewhat repetitious in character as opposed to the random character of Gaussian noise. By being repetitious did not mean that the signal repeated itself periodically for in such case known techniques, such as auto-correlation, could be used to make a determination and perhaps even extract the intelligence from the signal. In contrast, the present concept is not dependent on the data content per se, since analysis occurs prior to demodulation, but rather on a pattern or trait that makes the signal repetitious in some manner on a limited and preferably broad basis.

The theory which best explains this concept as presently understood is that there is a repetitive pattern formed by the distortion of the carrier signal by the modulation signal. This theory seems to hold true regardless of the type of modulation scheme which is employed in modulating the carrier signal with data, although better results have been obtained with some type of modulated signals than with others. In any event, it is now clear that it is possible to draw upon a repetitious quality of modulated data and by a matching or comparison of the patterns determine if modulation is present. Preferred embodiments of the invention which permit such determinations to be achieved are disclosed in the descriptions which follow.

Additional objects and advantages of the invention will set forth in part in the description which follows, and in part will be obvious from the description, or may be learned by practice of the invention. The objects and advantages of the invention may be realized and attained by means of the instrumentalities and combinations particularly pointed out in the appended claims.

In accordance with the purposes of the invention, as embodied and broadly described herein, the system of this invention comprises means for providing a pulse train in response to excursions from a predetermined amplitude level in the signals applied to said communication line, means for sampling the pulse train at a varying rate and retaining temporarily the pulses which are sampled, means for selectively comparing the pulses retained in said sampling means during the sampling of the pulse trains to determine whether there is an occurrence of predetermined digital states of the selected sampled pulses, said pulse comparison occurring repetitively, means for measuring the occurrences of said predetermined digital states of said selected sampled pulses as determined by said comparing means, and means responsive to said measuring means for providing an output indicative of the presence of data or noise in the communication line as determined by the occurrence of a predetermined magnitude of occurrence of predetermined digital states of said selected sampled pulses.

Preferably, there are means for providing timing pulses at a varying rate and the sampling means samples the pulse train at a varying rate in response to receipt of the timing pulses.

It is also preferred that there be a sampling period of predetermined duration and a plurality of comparison periods within each sampling period, the determination of whether there are occurrences of predetermined digital states occurring during each comparison period.

It is also preferred that the system of this invention be combined with a system for determining whether voice signals or an absence of signals is present on the communication line so that all four signal conditions can be distinguished.

The invention consists in the novel circuits, constructions, arrangements, combinations, and improvements shown and described. The accompanying drawings, which are incorporated in and constitute a part of the specification, illustrate several embodiments of the invention and, together with the description, serve to explain the principles of the invention.

DESCRIPTION OF THE PREFERRED EMBODIMENT

Reference will now be made in detail to the present preferred embodments of the invention, examples of which are illustrated in the accompanying drawings.

Figure 1:
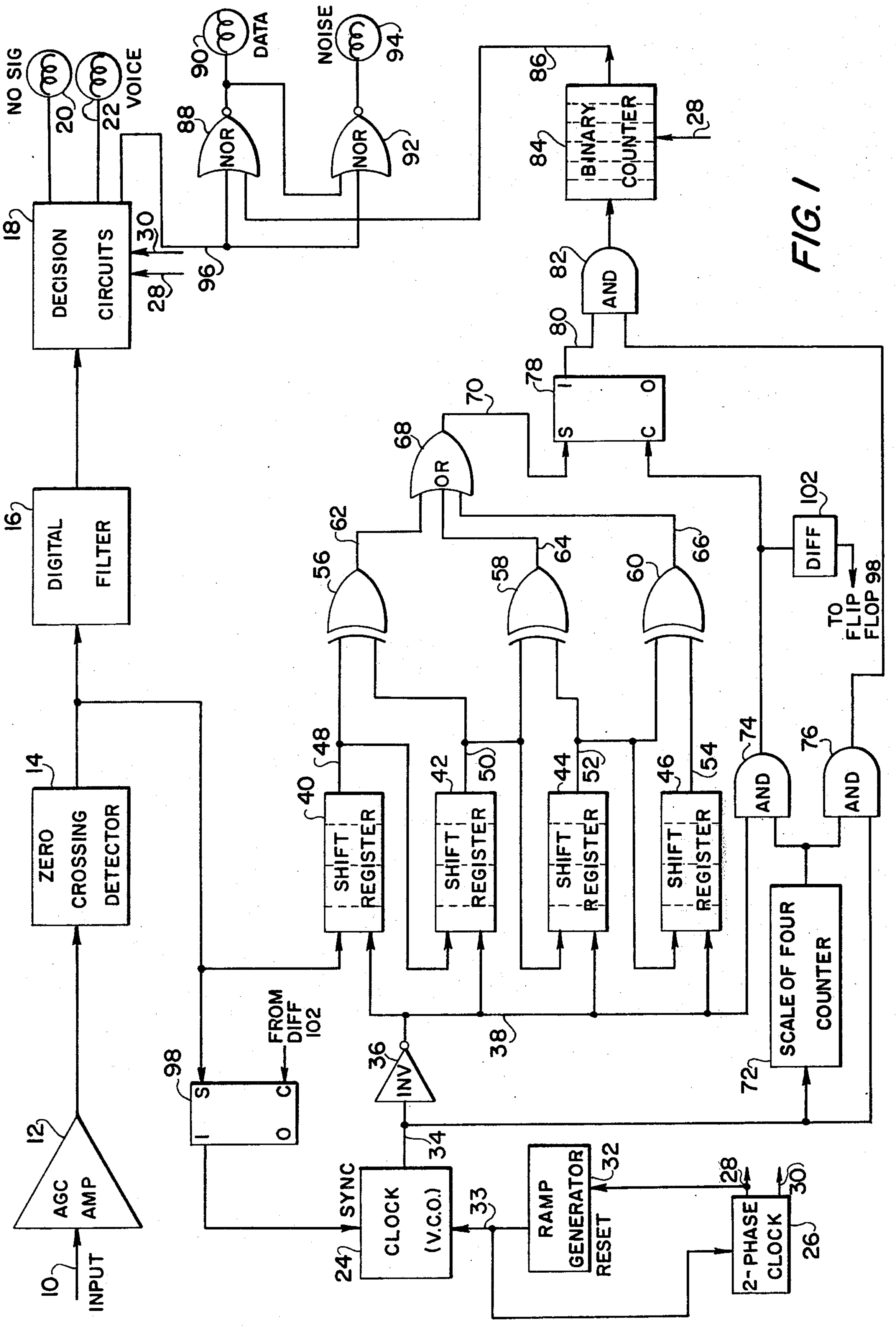
FIG. 1 illustrates a preferred embodiment of the invention in block diagram and logic form.

Referring now to the drawings and specifically FIG. 1, it should be understood that the system of the present invention can be connected into a communication line by an input line 10 so that noise or data signals can be received and analyzed. Where the system additionally distinguishes between voice signals and the absence of signals, line 10 also serves as the input for this expanded capability.

In accordance with the invention are means for providing a pulse train in response to excursions from a predetermined amplitude level in the signals applied to the communication line. As here embodied, this providing means further includes means for receiving the signals applied to such communication line and shaping them to provide a pulse train in which the edges of the pulses in the pulse train correspond to the zero crossings of the applied signals. Preferably, the latter means includes an amplifier 12 connected to the input line 10 so that the signals which are applied to the communication line are received and amplified. The output of amplifier 12 is connected to a shaping circuit, here identified as a zero crossing detector 14. The amplifier 12 preferably incorporates an automatic gain control circuit so that the system can accommodate input signals of a widely varying level, yet provide a substantially constant output level to the zero crossing detector. This AGC action, however, is somewhat slow acting so as not to elevate the level of low-level noise that might be present during brief interruptions of the applied signals, such as occurs during voice transmissions. The zero crossing detector 14 is preferably a squaring circuit which takes the output of amplifier 12 which is in AC form and generates a pulse train whose transitions or excursion from sharp edges which correspond to the zero crossings of the amplified signals.

The output of the zero crossing detector 14 is applied to the input of the digital filter 16. The digital filter can include, as an example, a pair of one-shots (not shown) to provide constant width pulses. One of these one-shots is actuated by pulse edges corresponding to positive-going excursions in the pulse train, and the other one-shot is actuated by edges corresponding to negative-going excursions in the pulse train. The two constant width pulses can then be applied to a coincidence gate with the output of such gate serving as the output of the digital filter 16 which is applied to the decision circuits 18. The operation of the digital filter 16 is such that when data is being received, a logic 0 is applied to decision circuits 18, when a no-signal condition exists at the input, the output of digital filter 16 is a logic 1; and in the presence of voice signals at input 10, the output of the digital filter is a logic 0 when signal bursts are present and a logic 1 in the pause between signal bursts. An example of this digital filter is shown in U.S. Pat. No. 3,767,860.

The logic in the decision circuits 18 processes the output of digital filter 16 with the aid of periodic clock inputs to provide an indication of a no-signal condition at lamp 20, the presence of voice signals at lamp 22, or the presence of either data or noise signals on line 96. As mentioned previously, the system disclosed in the aforesaid patent classified a noise input as data. While such classification may at times be acceptable, a further breakdown as to whether noise or data is the signal which is actually present can be helpful or desirable and in some situations may be a requirement. The capability to distinguish or discriminate between noise and modulated data is provided by the present invention, and this capability can be combined with a system such as that of the aforedescribed type to identity all four signal conditions, or can be used by itself where it is only desired to know whether modulated data or noise is present. This latter capability will first be described and will then be followed by an expanded description of an embodiment of a system which distinguishes between all four signal conditions.

Generation of Timing Pulses and Sampling Period

In accordance with the present invention, there are means for providing timing pulses at a varying rate. As embodied herein, such means comprise a variable frequency oscillator which generates timing pulses at a rate which varies between predetermined lower and upper limits. Preferably, the variable frequency oscillator is a voltagecontrolled oscillator 24 which functions as a variable clock to provide the timing or clock pulses for the system which vary in rate or frequency. This clock 24 sweeps between the two predetermined frequency or rate limits for the purpose of finding repetitive patterns, as more fully described hereinafter, in the pulse train which is applied by the zero crossing detector 14.

Clock 24 is preferably swept in frequency for a predetermined duration defined as a sampling period, and is then returned to its initial rate to begin a new sweep. To this end there is provided means for setting the variable frequeny oscillator at one of its predetermined limits at the start of each sampling period. As embodied herein, this setting means is a ramp voltage generator 32 whose output 33 is connected to the input of clock 24. The ramp voltage output is a sawtooth voltage which is reset at zero volts or some other minimum voltage level at the start of each sampling period.

A timer 26 is associated with the ramp generator 32 to establish sampling periods of predetermined duration. Timer 26 is preferably a two-phase clock which means that the clock has two outputs 28 and 30 each of which provides an output pulse alternatively during each sampling period. The input for the two-phase clock 26 is obtained from the output of ramp generator 32. Output line 28 of this two-phase clock is connected as the reset input to ramp generator 32.

It has been found in the present invention that a 4-second sampling period gives satisfactory results and is preferred, and the two-phase clock 26, accordingly, can be set to have a duration of 4 seconds. The sampling periods follow one another continuously. Each begins when ramp generator 32 is reset by the voltage pulse provided on output line 28 of the two-phase clock 26, which returns the ramp generator output to its minimum voltage level. Ramp generator 32 is self-running and its output voltage preferably increases in a linear manner. The two-phase clock 26 receives this ramp voltage and is preset to provide output pulses on lines 28 and 30 at predetermined intervals subsequent to the start of the sampling period in accordance with the voltage level attained by the ramp. For example, the first output pulse can be provided on line 30 halfway through the sampling period, or after two seconds have elapsed in the preferred 4-second example. The next output pulse appears at line 28 and is timed to occur at the end of the sampling period because its function is to reset ramp generator 32 to cause the existing sampling period to end and a new sampling period to begin. In the preferred example of a 4-second sampling period, the pulse on line 28 of course occurs after the passage of 4 seconds.

The ramp voltage of ramp generator 32 therefore has a duration equal in time to that of the sampling period and at the end of each sampling period is reset abruptly from its high voltage level to its minimum voltage level by clock 26 to begin a new ramp coincident with the start of the new sampling period. The two-phase clock 26 is of a known construction and as an example can include two voltage comparators each of which is set to a different predetermined reference voltage level to provide an output pulse when the ramp voltage reaches each such level. Preferably, this clock 26 is variable to permit the length of the sampling period to be changed as well as the point within the sampling period when the first clock output is obtained on line 30.

The output 33 of ramp generator 32 is connected to the input of clock 24 and is used to sweep the clock between its lower and upper rate limits during the preferred sampling period of 4 seconds. The clock is set at its lower rate limit at the start of the sampling period when the ramp generator 32 is reset and is driven or swept towards its upper rate limit by the increasing ramp voltage for the duration of the sampling period. This clock 24 is preferably swept slowly to assist the sampling apparatus in its detection of repetitive patterns, as more fully described hereinafter. As an example, the clock can be swept between 300 Hz and 3 KHz during each 4-second sampling period, and this frequency or rate range of one order of mangitude has been found in the preferred embodiment of FIG. 1 to provide a sufficiently slow sweep for the examination and detection of repetitive patterns. The output of clock 24 is a pulse waveform, having positive and negative half-waves of equal duration, which is applied to line 34. Both half cycles are preferably used in the system and an inverter 36 is employed to place the negative half-wave output in the proper logical state. The output of this inverter is applied to line 38.

Sampling and Comparing

In accordance with the invention, means are provided for sampling the pulse train at a varying rate and retaining temporarily the pulses which are sampled. This sampling means is connected to receive the pulse train which is applied in response to excursions in the signals in the communication line and is also connected to receive the timing pulses so that the pulse train is sampled at a varying rate in response to receipt of such timing pulses. As embodied herein, the sampling means comprises a plurality of serially arranged shift registers with the pulse train applied to the first shift register in the series. Preferably, there are four shift registers 40, 42, 44 and 46 with the outputs of shift registers 40, 42 and 44 forming the inputs of shift registers 42, 44 and 48, respectively. The pulse train output of the zero crossing detector 14 is applied to the input of shift register 40.

As embodied herein, the timing pulses are applied as clock inputs to each shift register. Preferably, clock output line 38 is is connected into each shift register 40, 42, 44 and 46 to clock or advance the pulses or bits stored in these shift registers. In the present description, the digital state of the pulse train generated at the zero crossing detector 14 will be represented by logical 1's and 0's. For example, a logic 1 can represent a positive pulse in the train and a logic 0 can represent a negative pulse in the train. Thus, the digital states within the stages of the shift registers shown are a combination of logic 1's and 0's as determined by the digital state of the pulse train each time the input stage of shift register 40 is clocked by clock 24. If the pulse train is a logic 1 when shift register 40 is clocked, a logic 1 is loaded into the first stage of this shift register. Similarly, if the pulse train is in the 0 stage when shift register 40 is clocked, a logic 0 is loaded into its first stage.

As each new pulse is loaded into shift register 40, the pulse previously loaded in the first stage is shifted one stage to the right, as viewed in FIG. 1. Whenever a pulse is clocked out of register 40, it is loaded into the first stage of register 42. Subsequent clockings also shift the pulses loaded in register 42 to the right. The same procedure applies with registers 44 and 46 except that when the pulse stored in the last stage of shift register 46 is shifted out of this register, it is not passed onto any additional stage but is dumped. The shift registers in effect perform a delay action on each pulse clocked into the input of shift register 40 since this pulse is not dumped out of shift register 46 until the passage of a number of full clock periods equal in number of the stages in the shift registers. Preferably, all shift registers 40, 42, 44 and 46 have the same number of stages, and for the present description it will be assumed that each shift register has four stages or a total of sixteen stages for all four shift registers shown.

In accordance with the invention, there are means provided for selectively comparing the pulses retained in the sampling means during sampling of the pulse train to determine whether there is an occurrence of predetermined digital states of the selected sampled pulses, said pulse comparison occurring repetitively. The sampling means has a plurality of outputs on which the sampled pulses appear, and the comparing means selectively compares the sampled pulses appearing at the outputs of such sampling means. As embodied herein, the plurality of outputs are seen to include at least one output connected to each shift register and preferably include a single output 48, 50, 52, 54, connected to the last stage of shift registers 40, 42, 44 and 46, respectively. The comparing means includes at least one Exclusive-OR gate selectively connected to the outputs of the shift registers to determine whether there is an occurrence of predetermined digital stages, for example, a match of the digital stages of the sampled pulses appearing at the outputs. Preferably, there are a plurality of Exclusive-OR gates, here shown as being three in number and identified by numerals 56, 58 and 60.

Each Exclusive-OR gate has two inputs. Exclusive-OR gate 56 has its inputs connected to output lines 48 and 50 from shift registers 40 and 42, respectively. Exclusive-OR gate 58 has its inputs connected to output lines 50 and 52 from shift registers 42 and 44, respectively. Exclusive-OR gate 60 has its inputs connected to output lines 52 and 54 of shift registers 44 and 46, respectively. The output of these three Exclusive-OR gates are individually applied onto lines 62, 64 and 66.

While the detailed operation of the preferred embodiment of FIG. 1 will be described later, the operation of the Exclusive-OR gates will not be briefly described to show both broadly and specifically the comparison concept. As discussed previously. repetitive patterns appear when modulated data is present on the communication line in contrast to line noise and is believed to be caused by the distortion of the carrier signal by the modulation signal. However, neither the frequency of the carrier nor the frequency of the modulation signal is of paramount interest because the present invention relies upon the detection of the presence of absence of patterns as opposed to a frequency spectrum analysis. In this search for repetitive patterns, the input signal is converted to pulse form and then sampled. The sampled pulses are temporarily stored and are compared with each other to see if in the changing combination of logic 1's and 0's the same pattern energes in all four registers. In FIG. 1, a match can be said to exist whenever the logical state of the four shift register output lines are the same, i.e., four 0's or four 1's. As now becomes readily apparent, if the same combination of pulses, i.e., the same pattern becomes stored in each shift register, then as these pulses are shifted or advanced by the clock pulses, a coincidence or match of logical states occurs repeatedly at the outputs of the shift registers until the pattern ceases to repeat. The match of these logical or digital states are readily detected by the operation of the Exclusive-OR gates.

It has been found convenient in determining whether or not there is a match to actually look for anti-coincidence or mismatch at the shift register outputs. Thus, if a mismatch is noted, there is an absence of a match; and, conversely, if there is an absence of a mismatch, a match of the digital states has to have occurred. The Exclusive-OR gate is especially suited to detect anti-coincidence or mismatches because whenever its inputs are not the same, its output is a logic 1. Whenever its inputs coincide, i.e., all 0's or all 1's, its output is a logic 0. Thus, by examination the output lines 62, 64, 66 of the three Exclusive-OR gates shown here, the presence or absence of a mismatch is readily determined. To aid in this examination, the output of each Exclusive-OR gate is applied to the input of an OR gate 68. The output of this OR gate is connected to line 70. During operation, as long as the outputs of the shift registers 40, 42, 44 and 46 all match, line 70 remains at logic 0. Should one or more of the Exclusive-OR gates detect a mismatch, however, line 70 rises to a 1. Thus, if logic 0's predominate at line 70, this will be indicative of the presence and detection of repetitive patterns in the input signal. Likewise, if logic 1's predominate at line 70, this will be indicative of the absence of repetitive patterns at the input.

In accordance with the invention, means are provided for establishing a plurality of comparison periods for the comparing means, the determination of whether there is an occurrence of predetermined digital states occurring during each such comparison period. As embodied herein, this establishing means is responsive to the receipt of a predetermined number of timing pulses for establishing each such comparison period, and in this respect includes a counter 72 connected to line 34 in order to receive the timing or clock pulses applied by the voltage controlled oscillator 24. Preferably, counter 72 is a scale-of-four counter and the comparison period, therefore, is equal to four clock pulse periods of clock 24. Counter 72 is a known construction and can as an example consist of two flip-flops (not shown) arranged in tandem with the input from the clock 24 being applied to the first flip-flop of the pair of the output being taken from the second flip-flop. The output of counter 72 is connected as an enabling input to two AND gates 74 and 76.

The establishing means further embodies a bistable device 78 which is responsive to the output of counter 72 and also to the output of the comparing means applied on line 70. This bistable device is preferably a flip-flop designed to be switched from a first or Clear state to a second or Set state in response to the occurrence of a matched state of the selected sampled pulses during a comparison period. As shown, flip-flop 78 has its Set input connected to output line 70 of OR gate 68. In this manner, the flip-flop is in essence connected to the output of all three Exclusive-OR gates 56, 58 and 60 so that anytime one or more of these flip-flops determines that a mismatch has occurred, a logic 1 is passed through OR gate 68 to set flip-flop 78.

Flip-flop 78 is returned to its first state or cleared at the end of a comparison period in response to receipt of the predetermined number of timing pulses by counter 72. As shown, the Clear input of this flip-flop is connected to the output of counter 72 via AND gate 74. The second input to AND gate 74 is line 38 which applies the clock pulse from clock 24 after it has been inverted by inverter 36. AND gate 74 is enabled at the end of the comparison period when counter 72 reaches the count of four, and the clock pulse can now pass through this AND gate to clear flip-flop 78. Flip-flop 78 is thus cleared at the end of each comparison period so that it is placed in condition to register the occurrence of a mismatch of the digital states of the sampled pulses should such occur during the next comparison period. The output of flip-flop 78 is provided on line 80.

The second input of AND gate 76 is connected to line 34. The output of this AND gate is connected into one input of another AND gate 82. The second input of AND gate 82 is connected to line 80. AND gate 76 is enabled at the end of each comparison period so that a clock pulse arriving on line 34 can pass through this gate into AND gate 82. If flip-flop 78 is set to show that a mismatch has occurred during the comparison period which is just ending, coincidence occurs at the input of AND gate 82 and a logic 1 is passed onto the measuring means to be described hereinafter. If flip-flop 78 is in the clear state to show that no mismatches (thus only matches) have occured, then line 80 is at a logic 0 level and no coincidence can occur at AND gate 82.

As described above, each comparison period has a preferred duration of four clock pulse periods. Thus, during each sampling period of 4 seconds, a large number of comparison periods occur; and during each such comparison period an examination of the contents of the shift registers 40, 42, 44 and 46 is made to determine whether there are mismatches in the pulses which have been sampled and temporarily stored. This operation will be described more fully hereinafter.

Match Counting and Output Circuits

In accordance with the invention, there are means provided for measuring the occurrences of said predetermined digital states of the selected sampled pulses as determined by the comparing means. As here embodied, the measuring means is a counter 84 which totals or counts the number of mismatches determined by the Exclusive-OR gates 56, 58 and 60. Preferably, this counter is a binary counter having an input connected to the output of AND gate 82 and thus responsive to the state of flip-flop 78. Counter 84 can advance only one count during each comparison period provided at least one mismatch has occurred. In such case, flip-flop 78 is set enabling AND gate 82; and at the end of the comparison period, a logic 1 is passed by AND gate 82 to the counts. During any comparison period, where a mismatch is not detected, flip-flop 78 is not set and coincidence cannot occur at AND gate 82 at the end of the comparison period.

Binary counter 84 is comprised of a plurality of stages with the output of the counter being taken from the last stage and applied on line 86. Line 86 is normally at a logic 0 indicative of data being present. If during a sampling period counter 84 counts a predetermined number of mismatches, then output line 90 goes from a logic 0 to a 1 to indicate that noise is present in the communication line.

Binary counter 84 has an additional input connected to the output line 28 of the two-phase clock 26. As was described earlier, clock 26 applied a pulse on line 28 at the end of each 4-second sampling period. At counter 84, this pulse serves two primary functions. One function is to reset all stages of the counter except the last stage at the end of each 4-second sampling period so that the counter is conditioned to undertake a new count of mismatched states during the next subsequent sampling period. The second function is to serve as a clock or toggle pulse to the last stage of the binary counter 84 so that its output, as it appears on line 86, is updated only at the end of each 4-second sampling period. Thus, even if the count in binary counter 84 should attain the predetermined count level prior to the end of the sampling period, the last stage of the counter becomes set but the output of the counter could not change until the 4-second period had elapsed and the update occurred.

The counter 84 must be of a sufficient length, that is contain a sufficient number of stages to handle the maximum mismatch count that can be expected to occur for any of the various types of modulated data that might be applied to the input. By so constructing the counter 84, it will not become filled when data is present, and a data input is not wrongly classified as noise.

In accordance with the invention, means are also provided which are respective to the measuring means for providing an output indicative of the presence of data or noise in the communication line as determined by a predetermined magnitude of occurrences of predetermined digital states of said selected sample pulses. As embodied herein, the output of binary counter 84 is applied by line 86 to data and noise indicating circuits to indicate that either data or noise is present in the communication line. Preferably, line 86 is connected to a coincidence gate here represented by NOR gate 88. The output of this NOR gate is applied to a lamp 90 identified as the DATA lamp. The output of NOR gate 88 is also applied to the input of a second coincidence gate, again represented by a NOR gate 92. The output of this latter NOR gate is applied to lamp 94 here identified as the NOISE lamp. The second input of both gates 88 and 92 is connected to line 96 leading from the output of decision circuits 18. For the purpose of the present description where the system is assumed not to include the additional capability of detecting voice signals or no signal conditions and is directed solely to distinguishing between noise and data signals, line 96 is connected to a potential which applies a permanent logic 0 as an enabling signal to both gates 88 and 92.

Operation

In the description of operation of the embodiment shown in FIG. 1, it is assumed that either data or noise is present on the communication line and being applied to input 10. There is no need therefore to describe the action of digital filter 16 and decision circuits 18, and line 96, is at a potential that places a logic 0 at one input of NOR gates 88 and 92. It is also assumed that ramp generator 32 and two-phase clock 26 establish a 4-second sampling period, and during each sampling period the output of clock 24 sweeps from 300 Hz to 3 KHz. The output of clock 24 is a square wave in which each clock pulse period begins with a logic 1 half-cycle and ends with a logic 0 half-cycle. Thus, a logic 1 appears first on line 34 for a half-pulse period and then because of the presence of inverter 36 appears on line 38 during the second half of the clock pulse period.

Generally, the range or band of frequencies which can appear at the input line 10 is known, and it is assumed that any data which appears will be within the frequency range of 300 through 4,000 Hz. The input signals which are received are amplified in AGC amplifier 12 and then shaped in zero-crossing detector 14 to provide a continuous pulse train. This pulse train is applied to the input of shift register 40.

Clock 24 begins its sweep and applied clock pulses on line 38 to the four shift registers 40, 42, 44 and 46. The digital or logical state of the pulse train is now continuously sampled by the clock pulses. Each sampled pulse is first applied to shift register 40, and then advanced or shifted through shift register 40 and the remaining three registers in response to continued application of clock pulses. The four shift registers quickly become loaded with sampled pulses, and as each new pulse is clocked into register 40, the oldest is dumped out of register 46.

As described previously, each 4-second sampling period is divided into a plurality of comparison periods and each comparison period is preferably four clock pulse periods in length, this having been predetermined by the scale-of-four counter 72. The three Exclusive-OR gates 56, 58 and 60 compare the four outputs of the shift registers following each clock pulse, or 4 times in all during each comparison period, to see whether there is a mismatch of the sampled pulses at any pair of outputs. In this way, the entire contents of the four shift registers are compared during each comparison period. Should any of the register outputs 48, 50, 52 and 54 not be at the same logical state as the other outputs during any of the four comparisons, then from one to three mismatches can occur. In such case, at least one logic 1 signal is applied to OR gate 68 and flip-flop 78 becomes set.

The output of counter 72 is normally a logic 0, and both AND gates 74 and 76 are disabled. The fourth clock pulse out of clock 24 during a comparison period advances counter 72 to the fourth count and its output goes to logic 1; enabling the two AND gates 74 and 76. The clock pulse at this time is still present on line 34 and it passes through enabled gate 76 to AND gate 82. If flip-flop 78 has been set during the comparison period in response to a mismatch having been detected by any of the three Exclusive-OR gates, the arrival of the pulse from AND gate 76 finds AND gate 82 enabled. A logic 1 appears at the output of this AND gate and is passed to binary counter 84 to be counted.

The second half of the fourth clock pulse in the comparison period is a logic 0 which is inverted at 36 and applied by line 38 to the enabled AND gate 74. A logic 1 is passed out of this AND gate to clear flip-flop 78. The comparison period ends and a logic 0 is now applied by this flip-flop to AND gate 82.

During each comparison period the pulse train applied at the input of shift register 40 is sampled four times by the clock pulses, and the sampled pulses which have been previously stored in the shift registers are advanced four stages. For the four-stage registers used in FIG. 1, this means that register 40 is loaded with new samples and the remaining three registers acquire the contents of the register which precedes them during the span of a comparison period. Because the clock 24 is swept slowly, e.g., between 300 Hz and 3 KHz in 4 seconds, the system effectively samples the pulse train at regular intervals during each comparison period.

If data is present, there will be certain rates attained by clock 24 in its sweep where the same pattern of logic 1's is clocked in the same sequence into each of the four shift registers. Whenever this occurs, then for one or more comparison periods the contents of the four shift registers 40, 42, 44 and 46 are identical. During each such comparison period therefore, the four outputs 48, 50, 52 and 54 continually match (all 1's or all 0's) as the sampled pulses are shifted or advanced through the shift registers. Because no mismatches are detected by the Exclusive-OR gates 56, 58 or 60, flip-flop 78 does not become set. At the end of each such comparison period, the pulse applied by AND gate 76 does not find AND gate 82 enabled and the output of this latter gate remains at logic 0. The binary counter 84 accordingly has no mismatch to count.

At the end of the 4-second sampling period, a pulse is generated by the two-phase clock 26 and applied by line 28 to binary counter 84. This binary counter has not attained a full count, and a logic 0 appears on output line 86. Coincidence occurs at NOR gate 88 and a logic 1 is applied to lamp 90 to illuminate this lamp and give an indication of the presence of data. This logic 1 output is also applied by NOR gate 88 to one input of NOR gate 92 and its output is held at logic 0. Lamp 94 remains dark. The pulse on line 28 is also applied to ramp generator 32 to reset the ramp voltage. The ramp generator in turn restarts the two-phase clock 26 and resets the variable clock 24 at its lower frequency limit of 300 Hz. A new sampling period begins. As long as modulated data continues to be applied to the input 10, the system continues to display the presence of DATA at lamp 90 because an insufficient number of mismatches occurs during each sampling period to permit binary counter 84 to reach a count indicative of noise.

While certain rates attained by clock 24 in its 4-second sweep cause identical pulse sequences to be loaded into the four shift registers by the sampling of the input pulse train, there will be clock sampling rates where no repeat patterns are found and coincidence at the four shift register outputs is infrequent. The Exclusive-OR gates then detect one or more mismatches during the comparison periods. However, flip-flop 78 can only be set once during any comparison period of four clock pulses regardless of the number of times that a mismatch occurs at the shift register outputs, and only one mismatch is counted by binary counter 84 for any one single comparison period.

Assume now that noise is present at input 10. It is assumed that the level of this noise is above the release point of the AGC circuit in amplifier 12, and thus the AGC acts upon the noise to raise it to a constant output level. The amplified noise is then applied to zero-crossing detector 14 and a pulse train output occurs. This pulse train is applied to the input of shift register 40 where it is sampled by the clock pulses from variable clock 24 during each 4-second sampling period.

The random character of the noise makes the probability quite low that repetitive patterns will be observed as clock 24 sweeps through its frequency band during the sampling period. If such repetitive patterns do occur, they will do so infrequently and generally in a random manner. The outputs of the shift registers 40, 42, 44 and 46 do not match except at random times during the sampling period. Thus, a large number of noncoincident inputs appear at the Exclusive-OR gates 56, 58 and 60 during each sampling period. During each comparison period, therefore, there is a large possibility that at least one mismatch will occur at the shift-register outputs. When such does occur, it is detected by one of the Exclusive-OR gates, and flip-flop 78 is set. A count is then applied to binary counter 84 at the end of the comparison period.

A sufficient number of mismatches are counted during the total sampling period to cause binary counter 84 to attain its predetermined count. The last stage (not shown) in counter 84 is set to hold this count. When a pulse is applied by the two-phase clock 26 on line 28 at the end of the sampling period, the output stage of the binary counter is clocked to cause line 86 to go to a logic 1. The output of NOR gate 88 to logic 0, and NOR gate 92 now see two logic 0 inputs. Its output goes to logic 1 causing lamp 94 to become illuminated and indicate that NOISE is present in the communication line. At the same time lamp 90 becomes dark.

Synchronizing Circuit

It has been found in the practice of the present invention that repetitive pattern detection can be enhanced if means are provided for synchronizing the generation of the timing pulses with the pulses generated by the zero-crossing detector 14. As embodied herein, the synchronizing means includes a second bistable device, here shown as flip-flip 98 in FIG. 1, having a pair of inputs and an output which is connected to the variable frequency oscillator or clock 24.

Preferably, the first or set input of flip-flop 98 is connected to receive the pulses in the applied pulse train. Whenever this flip-flop has been cleared, it is switched to the set state by the arrival of a pulse edge represented by the transition from a logic 0 to a logic 1 level. The Clear input is connected to the output of differentiator 102 which is in turn connected to the output of AND gate 74. Flip-flop 98 is cleared at the end of each comparison period when the scale-of-four counter 72 attains its fourth count. The clock pulse which passes through enabled gate 74 at the end of the comparison period is differentiated at differrentiator 102, and a spike is applied to the Clear input of flip-flop 98. In operation, therefore, the synchronizing signal is removed from clock 24 and the generation of clock pulses temporarily halted at the end of each comparison period, but a new synchronizing signal is applied to restart clock pulse generation by the next logic 0 to logic 1 transition in the pulse train applied by the zero-crossing detector 14.

If the clock rate 24 or a multiple thereof is not quite equal to the pulse rate of the pulse train, the phase-difference between the two rates can cause non-repetitive patterns to be sampled and stored in the shift register even though repetitive patterns may be present in the pulse train. The synchronizing means, therefore, stops the clock at the end of a comparison period and permits it to restart only upon the arrival of a pulse transition in the pulse train out of zero-crossing detector 14. In this way, each conparison period begins with the first clock pulse and the first pulse train pulse arriving at approximately the same time at the input of shift detector 40. The result is that there is a higher probability of detecting a repetitive pattern because the two pulse rates will remain more nearly in phase during the brief comparison period.

Voltage-controlled oscillators with synchronizing leads are well known and what generally occurs and preferably occurs here is that the oscillator is clamped in the absence of the synchronizing signal to prevent further oscillations from occuring. The synchronizing input serves to unclamp the oscillator so that is can again oscillate and emit output signals. The use of the synchronizing means in the present invention which momentarily stops the oscillator or clock 24 at the end of each comparison period does not actually prevent the clock from attaining substantially its full sweep during the 4-second sampling period. This is because ramp generator 32 continues to run even when clock 24 is briefly stopped at the end of each comparison period. When clock 24 renews operation in response to the applied sync signal from flip-flop 98, the clock pulses will be generated at a slightly increased rate. The effect upon the detection of repetitive digital patterns is at most minimal, and the output of clock 24 can in effect still be considered a continuous sweep between the preset upper and lower rate limits.

Tapped Delay Line

Figure 2:
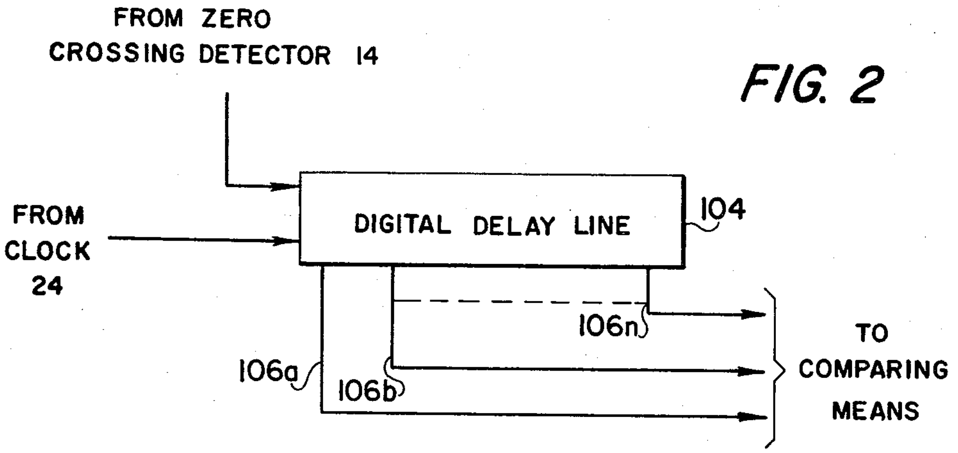
FIG. 2 is an alternative construction of the sampling means described in FIG. 1.

An alternative construction of the sampling means is shown in FIG. 2. As embodied herein, a digital delay line 104 is presented in block form. As in the case of the shift register chain shown in FIG. 1, the pulse train to be sampled is applied by the zero-crossing detector 14 to one input of delay line 104, and the clock or timing pulses provided by clock 24 are applied to the second input of this delay line. Each pulse in the train which is sampled by clock 24 is inserted at the beginning of the delay line as a logic 0 or logic 1 bit or pulse and these bits progress along the line in response to subsequent loadings of the sampled pulses.

A plurality of outputs 106*a*, 106*b* . . . 106*n* are preferably spaced evenly along the delay line 104 so that these plurality of outputs can be compared in the search for repetitive patterns in the applied pulse train. These outputs are connected into a suitable type of comparing means. As an example, such comparing means can comprise the Exclusive-OR gates described in the embodiment of FIG. 1. Another example of a comparison means suitable for detecting matches or mismatches of the signals on the output lines 106 is an adder which could total the pulses following each clock pulse and determine a match or mismatch based upon the sum obtained.

Decision Circuits 18 and Expanded System Operation

As mentioned previously, the system for distinguishing between noise and data signals can be expanded to additionally distinguish between voice signals and the absence of signals at input line 10 and suitable additional circuitry can be employed for that purpose. An example of a specific system which is adaptable for this purpose is that disclosed in the aforementioned U.S. Pat. No. 3,767,860. The operation of such system was described briefly earlier in this specification. However, for a clearer understanding of just how noise, data, voice and a no-signal condition can be discriminated each from the others, a description of the preferred embodiment of the decision circuits 18 in combination with FIG. 1 will now be undertaken.

Figure 3:
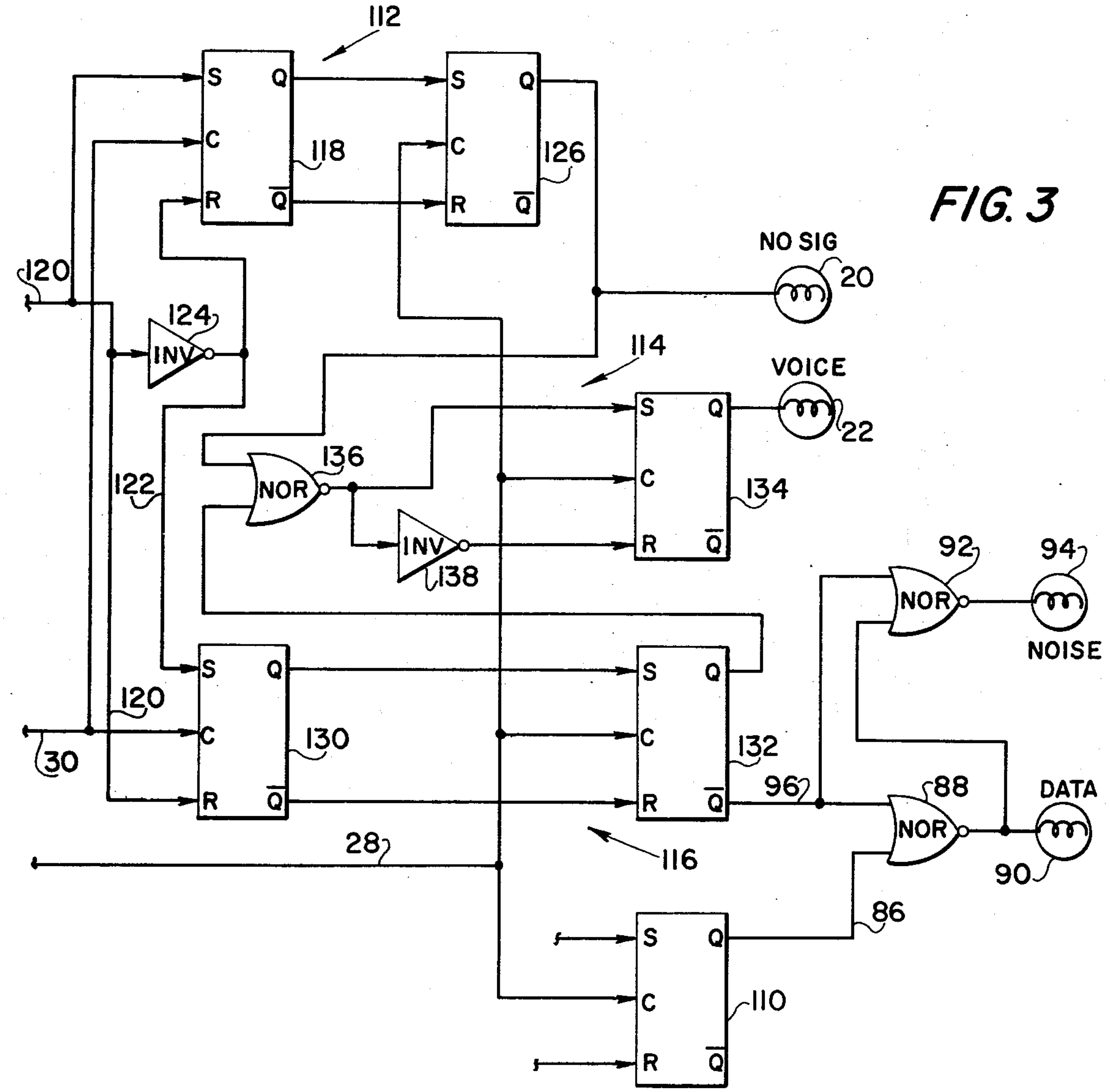
FIG. 3 is a preferred embodiment in block diagram and logic form of the decision circuits of FIG. 1.

The decision circuits are shown in block diagram and logic form in FIG. 3. Includes as part of the decision circuits is the output or last stage 110 of binary counter 84 described in FIG. 1. This output stage, which is preferably a flip-flop as shown, is updated at the end of each four-second sampling period, as are the output stages of the decision circuits, and a better understanding of system operation can be obtained if this counter output stage is included as part of the decision circuitry discussion.

As embodied herein, the decision circuits are connected as three channels, indicated generally by arrows 112, 114 and 116. The input to these three channels are applied by digital filter 16 on line 120 and by the two-phase clock on lines 28 and 30. Depending upon the type of signal, or absence of signal, presented at the input line 10 one and only one of these circuits will be actuated. The signal which is derived at each channel can be used to provide either control or indication functions, by way of example. Preferably, each output is used to drive an output lamp.

Channels 112 and 116 both include a pair of JK flip-flops connected in tandem to function as a shift register. As may be seen from the figure, channel 112 includes flip-flop 18 whose SET input is connected to line 120 and whose RESET input in connected to line 122. An inverter 124 is connected between lines 120 and 122. The clock input of flip-flop 118 is connected to line 30. The Q output of flip-flop 118 is connected to the SET input of flip-flop 126. The RESET input of flip-flop 126 is connected to the $\overline{Q}$ output of flip-flop 118, and its clock input is connected to line 28. The Q output of flip-flop 126 is connected to lamp 20, although an output transistor can be interposed in the output line if desired.

Channel 116 is of similar construction; however, the SET side of the input flip-flop 130 is connected to line 122 while the RESET input is connected to line 120. The clock input is connected to line 30. The Q output of flip-flop 130 is connected to the SET input of flip-flop 132 and the $\overline{Q}$ output of flip-flop 130 is connected to the RESET input of flip-flop 132. The clock input of flip-flop 132 is connected to line 28. The $\overline{Q}$ output of flip-flop 132 is connected to output line 96 of the decision circuits 18.

Channel 114 differs in construction from channels 112 and 116 and preferably contains a single flip-flop 134 whose clock input is connected to line 28. The SET input of flip-flop 72 is connected to the output of a NOR gate 136. The two inputs to NOR gate 136 are connected to the Q output of flip-flop 126 in channel 112 and the Q output of flip-flop 132 in channel 116. The output of NOR gate 136 is also connected to the input of inverter 138 whose output is in turn connected to the RESET input of flip-flop 134. The Q output of flip-flop 134 is connected to lamp 22, although an output transistor can be interposed in the output line if desired.

In operation, the range or band of frequencies which can appear at the input line 10 (FIG. 1) is known, an example being the range of 300 Hz–3KHz. Assume for the purpose of the description of operation of the invention that a telephone line is being monitored at input line 10 (in FIG. 1). In such case, all of the applied signals will be tones. As explained in the aforementioned U.S. Pat. No. 3,767,860, whenever data is applied on the input line 10, a logic 0 is applied on line 120 at the input to the decision circuits 18. Because of the continuous character of noise, its application at input 10 is interpreted by the digital filter 16 as data and a logic 0 is also applied to the input of the decision circuits by line 120.

When no signal is being applied at input 10 in FIG. 1, a logic 1 is applied by the digital filter 16 on line 120. During the presence of voice signals at input 10, the output applied by the digital filter 16 on line 120 is a logic 0 when signal bursts are present, but between signal bursts, line 120 becomes a logic 1.

For purposes of convenience, channel 112 has been designated the "NO-SIGNAL" channel, and channel 114 has been designed the "VOICE" channel.

Assuming that a no-signal condition is present at the input 10 (FIG. 1), a logic 1 is applied on line 120 to set the flip-flop 118 in channel 112. At clock 26, the first output pulse is applied over line 30 to the clock input of flip-flop 118 to cause its Q output to rise to the logic 1 state. This logic 1 is thus shifted or applied to the SET input of flip-flop 126. The subsequent clock output, which arrives at the end of the four-second sampling period, is applied on line 28 and thus to the clock input of flip-flop 126. The Q output of this flip-flop rises to a logic 1 and illuminates lamp 20. In this manner an indication of a "no-signal" condition is made.

If the no-signal condition terminates prior to the actuation of lamp 20, the signal on input line 120 becomes a logic 0. This is inverted at inverter 124 to a logic 1 and applied by line 122 to the RESET input of flip-flop 118. This RESET is self-clocking and the $\overline{Q}$ output of flip-flop 118 becomes a logic 1 and the Q output becomes a logic 0. Thus, flip-flop 126 cannot be set by the subsequent clock pulse applied by line 28 to its clock input, and lamp 20 does not become lit. In a similar manner, channel 112 is reset when the no-signal condition ends. Flip-flop 118 becomes reset as described above, and then the next clock pulse on line 28 resets flip-flop 126 because a logic 1 is now being applied to its RESET input by the $\overline{Q}$ output of flip-flop 118. Lamp 20 becomes dark.

Channel 116 operates in much the same way as the NO-SIGNAL channel 112, except that the inverter 124 changes the logic 0 appearing on line 120 when DATA or NOISE is present, to a logic 1 which is applied to the SET input of flip-flop 130. If the input signals persist for both phases of clock 26 during the 4-second sampling period, the logic 1 signal is first transferred from flip-flop 130 by flip-flop 132 by the clock pulse applied on line 30; and then applied at the Q output of this latter flip-flop by the clock pulse applied on line 28. At the $\overline{Q}$ output, a logic 0 is applied on line 96 to indicate the presence of DATA or NOISE signals at the input of the system.

Should the DATA or NOISE input signals end prior to the time a logic 0 is applied to line 96, channel 116 is cleared in the same manner as channel 112 except tht the self-clocking reset of flip-flop 130 is actuated by a logic 1 on line 120. Similarly, the reset of channel 116 is initiated when the DATA/NOISE input ends by a logic 1 signal resetting flip-flop 130. A logic 0 is clocked to flip-flop 132 and this is followed by a clock pulse on line 28 resetting flip-flop 132 at the end of a sampling period.

When VOICE signals are applied to input 10 in FIG. 1, the level of line 120 is a logic 0 when a burst of VOICE is present and at logic 1 in the pause between bursts. It has been assumed that uninterrupted speech or an uninterrupted pause will not persist for more than 2 seconds. Thus, neither logic signal persists long enough without interruption to permit clock 26 (FIG. 1) to generate both an output on line 30 followed by an output on line 28. Neither channel 112 nor channel 116 has sufficient time to become completely activated. The Q outputs of both flip-flops 126 and 132 are or become a logic 0. NOR gate 136 in channel 114 receives both of these signals and provides a logic 1 output to the SET input of flip-flop 134. When the sampling period then in progress ends, a spike from clock 26 arrives on line 28 to set flip-flop 134. The Q output of this flip-flop applies a logic 1 to lamp 22 to turn it on and indicate the presence of VOICE signals on the line being monitored at input 10.

When the VOICE signals end, either a DATA/NOISE signal or a NO-SIGNAL condition occurs. When the Q output of either flip-flop 126 or flip-flop 132 becomes a logic 1 according to the operation described previously, NOR gate 136 assumes a logic 0 condition which is inverted by inverter 138 to reset flip-flop 72 by its self-clocking action. Lamp 22 goes dark.

With additional reference to the complete system shown in FIG. 1, whenever line 96 is clocked to a logic 0 by operation of decision circuits 18, this is indicative of the presence of either noise or modulated data at the input 10. The output obtained at binary counter 84 must therefore be considered to resolve the question of which signal is actually present.

The last stage 110 of counter 84 is shown in FIG. 3 and as can be seen it is preferably connected in the same manner as the output flip-flops of channels 112, 114 and 116. Flip-flop 110 is thus clocked by the pulse applied by two-phase clock 26 on line 28 at the end of each 4-second sampling period. If counter 84 fails to reach the predetermined noise (mismatch) count by the end of a sampling period, a logic 1 is applied to the Reset input of flip-flop 110, and a logic 0 is clocked onto line 86 by the clock pulse on line 28. Similarly, if counter 84 does reach its predetermined mismatch count prior to the end of the 4-second sampling period, a logic 1 is applied to the Set input of flip-flop 110 and this level is clocked onto line 86 at the end of the sampling period.

Whenever line 96 is clocked to a logic 0 at the end of a sampling period, the clocking of a logic 0 onto line 86 further classifies the input as data. NOR gate 88 provides a logic 1 output and lamp 90 becomes illuminated to give a positive indication of the presence of data at the input. On the other hand, if line 86 is clocked to a logic 1 at the end of the sampling period, the input is now clearly identified as noise. An indication of this is made at lamp 94 which becomes illuminated by the logic 1 applied by NOR gate 92.

It should be noted that in the expanded system where all four input conditions can be distinguished, the signal applied on line 86 has no significance unless line 96 is at a logic 0. In other words, if the decision circuits 18 determine that voice or a no-signal condition exists, it is immaterial to the decision-making process what output is provided on line 86 by that part of the system which distinguishes between noise and data. Electronically, this can be appreciated by the fact that a logic 1 signal on line 96 holds the outputs of NOR gates 88 and 92 at a logic 0. Neither lamp 90 nor 94 can become illuminated, regardless of the signal applied on line 86, as long as the logic 1 persists on line 96.

The advantage of having the output flip-flop in each channel and flip-flop 110 of counter 84 all clocked by the same signal is that the entire system output and display is updated simultaneously. In this manner, the system keeps one lamp illuminated continuously until the signal at the input changes from one of the four types to another type and is processed by the system. At such time, the system functions in the manner as has been described to detect this change in the type of input signal and indicate the change at lamps 20, 22, 90 and 94. The simultaneous clocking of the four output flip-flops causes the lamp which was lit to go dark and at the same time illuminates the lamp corresponding to the type of signal now appearing at the input.

The expression "modulated data" as used herein encompasses amplitude, frequency and phase modulation, and the present invention is adaptable to detecting any of these types or combinations of these types of modulated data. Examples of the particular modulation schemes which can be employed include such things as 4-phase modulation, 8-phase modulation, vestigial sideband modulation, frequency-shift-keying (FSK), and channelized FSK or frequency-division-multiplex (FDM). The particular scheme used is usually dependent upon a modem which interfaces the digital equipment and the analog communications line. Where such modems are employed, the systems of the present invention are designed to be coupled to the communication line on the analog or AC side of the modem, that is, after modulation and before demodulation has occurred.

It will be apparent to those skilled in the art that various modifications and variations can be made in the systems of the present invention without departing from the scope or spirit of the invention.

What is claimed is:

1. A system for distinguishing between noise and data signals in a communication line comprising:

a. means for providing a pulse train in response to excursions from a predetermined amplitude level in the signal applied to said communication line, b. means for sampling the pulse train at a varying rate and retaining temporarily the pulses which are sampled, c. means for selectively comparing the pulses retained in said sampling means during the sampling of the pulse train to determine whether there is an occurrence of predetermined digital states of the selected sampled pulses, said pulse comparison occurring repetitively, d. means for measuring the occurrences of said predetermined digital states of said selected sampled pulses as determined by said comparing means, and e. means responsive to said measuring means for providing an output indicative of the presence of data or noise in the communication line as determined by a predetermined magnitude of occurrences of predetermined digital states of said selected sampled pulses.

2. A system as claimed in claim 1 wherein:
a. said sampling means has a plurality of outputs on which the sampled pulses appear, and
b. said comparing means selectively compares the sampled pulses appearing at the outputs of said sampling means.

3. A system as claimed in claim 2 wherein:
a. said sampling means comprises a plurality of serially-arranged shift registers with the pulse train applied to the first shift register in the series, and
b. said plurality of outputs includes at least one output connected to each shift register.

4. A system as claimed in claim 3 wherein:
a. said comparing means includes at least one Exclusive-OR gate selectively connected to the outputs of said shift registers to determine whether there is an occurrence of the predetermined digital states of the sampled pulses appearing at the outputs.

5. A system as claimed in claim 4 wherein:
a. said occurrence measuring means is a binary counter responsive to said at least one Exclusive-OR gate to count the number of occurrences determined by said gate.

6. A system as claimed in claim 2 wherein:
a. said sampling means is a digital delay line with the pulse train applied to the input of the delay line, and
b. said plurality of outputs are outputs spaced evenly along the delay line.

7. A system as claimed in claim 6 wherein:
a. said comparing means includes at least one Exclusive-OR gate selectively connected to the outputs of said digital delay line to determine whether there is an occurrence of the predetermined digital states of the sampled pulses appearing at the outputs.

8. A system for distinguishing between noise and data signals in a communication line comprising:
a. means for providing a pulse train in response to excursions from a predetermined amplitude level in the signals applies to said communication line,
b. means for providing timing pulses at a varying rate,
c. means connected to receive the pulse train and timing pulses for sampling the pulse train at a varying rate in response to receipt of said timing pulses and retaining temporarily the pulses which are sampled,
d. means for selectively comparing the pulses retained in said sampling means during the sampling of the pulse train to determine whether there is an occurrence of predetermined digital states of the selected sampled pulses, said pulse comparison occurring repetitively
e. means for measuring the occurrences of said predetermined digital states of said selected sampled pulses as determined by said comparing means, and
f. means responsive to said measuring means for indicating the presence of data or noise in the communication line as determined by a predetermined magnitude of occurrences of predetermined digital states of said selected sampled pulses.

9. A system as claimed in claim 8 wherein:
a. said means for providing timing pulses comprises a variable frequency oscillator for generating timing pulses at a rate which varies between predetermined lower and upper limits.

10. A system as claimed in claim 9 further comprising:
a. a timer for establishing a sampling period of predetermined duration, and
b. means for setting said variable frequency oscillator at one of said predetermined limits at the start of each sampling period.

11. A system as claimed in claim 10 wherein:
a. said variable frequency oscillator is a voltage-controlled oscillator, and
b. said setting means is a ramp voltage generator which sets said voltage-controlled oscillator at its lower rate limit at the start of each sampling period and drives said oscillator toward its upper rate limit for the duration of the sampling period.

12. A system as claimed in claim 9 wherein:
a. said sampling means has a plurality of outputs on which the sampled pulses appear, and
b. said comparing means selectively compares the sampled pulses appearing at the outputs of said sampling means.

13. A system as claimed in claim 12 wherein:
a. said sampling means comprising a plurality of serially-arranged shift registers with the pulse train applied to the first shift register in the series, and the timing pulses applied as clock inputs to each shift register, and
b. said plurality of outputs include at least one output connected to each shift register.

14. A system as claimed in claim 12 wherein:
said sampling means is a digital delay line with the pulse train applied to the input of the delay line, and
b. said plurality of outputs are outputs spaced evenly along the delay line.

15. A system as claimed in claim 14 wherein:
a. said comparing means includes at least one Exclusive-OR gate selectively connected to the outputs of said digital delay line to determine whether there is an occurrence of the predetermined digital states of the samples pulses appearing at the outputs.

16. A system as claimed in claim 9 wherein:
a. said means for providing a pulse train comprises:
B. means for receiving the signals applied to the communication line and shaping them to provide a pulse train in which the edges of the pulses in the pulse train correspond to the zero-crossing of the applied signals, said system further comprising:
b. means for synchronizing the generation of timing pulses with the pulses in the pulse train.

17. A system as claimed in claim 16 wherein:
a. said means for providing timing pulses comprises a variable frequency oscillator for generating timing pulses at a rate which varies between predetermined lower and upper limits.

18. A system as claimed in claim 17 wherein:
a. said synchronizing means is a second bistable device having a pair of inputs, and an output connected to said variable frequency oscillator,
b. one of said inputs being connected to receive the pulses in the pulse train to switch the second bistable device from a first state to a second state in response to the arrival of the edge of a pulse, and apply a synchronizing signal to said variable frequency oscillator,
c. the other of said inputs connected to be responsive to the output of said counter to be returned to its first at the end of a comparison period.

19. A system for distinguishing between noise and data signals in a communication line comprising:
a. means for providing a pulse train in response to excursions from a predetermined amplitude level in the signals applied to said communication line,
b. means for providing timing pulses at a varying rate,
c. means connected to receive the pulse train and timing pulses for sampling the pulse train at a varying rate in response to receipt of said timing pulses and retaining temporarily the pulses which are samples,
d. means for selectively comparing the pulses retained in said sampling means during the sampling of the pulse train to determine whether there is an occurrence of predetermined digital states of the selected sampled pulses, said pulse comparison occurring repetitively,
e. means for establishing a plurality of comparison periods for said comparing means, the determination of whether there is an occurrence of predetermined digital states occurring during each such comparison period,
f. means for measuring the occurrences of said predetermined digital states of said selected sampled pulses as determined by said comparing means during each such comparison period, and
g. means responsive to said measuring means for indicating the presence of data or noise in the communication line as determined by a predetermined magnitude of occurrences of predetermined digital states of said selected sampled pulses.

20. A system as claimed in claim 19 wherein:
a. said establishing means is responsive to the receipt of a predetermined number of timing pulses for establishing each such comparison period.

21. A system as claimed in claim 20 wherein said establishing means comprises:
a. a counter connected to receive said timing pulses, and
b. a bistable device connected to said counter and to the output of said comparing means,
c. said bistable device being switched from a first state to a second state in response to the occurrence of predetermined digital states of the selected sampled pulses during a comparison period, and being returned to its first state at the end of a comparison period in response to the receipt of the predetermined number of timing pulses by said counter.

22. A system as claimed in claim 21 wherein:
a. said occurrence measuring means is a binary counter connected to the output of said bistable device to count the occurrences of predetermined digital states of the selected sampled pulses in response to said bistable device being in said second state during a comparison period.

23. A system as claimed in claim 22 wherein said comparing means includes:
a. a plurality of Exclusive-OR gates selectively connected to the outputs of said shift register, and
b. A gate connected between the outputs of said plurality of Exclusive-OR gates and the input of said bistable device.

24. A system as claimed in claim 23 wherein:
a. said binary counter is connected to the output of said timer whereby said binary counter is reset at the end of each sampling period.

25. A system as claimed in claim 21 wherein:
a. said means for providing timing pulses comprises a variable frequency oscillator for generating timing pulses at a rate which varies between predetermined lower and upper limits.

26. A system as claimed in claim 25 further comprising:
a. a timer for establishing a sampling period of predetermine duration, each said sampling period being of much greater duration than each such comparison period, and
b. means for setting said variable frequency oscillator at one of said predetermined limits at the start of each sampling period.

27. A system as claimed in claim 26 wherein:
a. said bistable device is a flip-flop having a first input connected to receive the output of said comparing means, a second input connected to receive the output of said counter, and an output connected to the input of said measuring means.

28. A system as claimed in claim 27 wherein:
a. said sampling means has a plurality of outputs on which the sampled pulses appear, and
b. said comparing means selectively compares the sampled pulses appearing at the outputs of said sampling means.

29. A system as claimed in claim 28 wherein:
a. said sampling means comprises a plurality of serially-arranged shift registers with the pulse train applied to the first shift register in the series, and the timing pulses applied as clock inputs to each shift register, and
b. said plurality of outputs include at least one output connected to each shift register.

30. A system as claimed in claim 29 wherein:
a. said comparing means includes at least one Exclusive-OR gate selectively connected to the outputs of said shift registers to determine whether there is an occurrence of the predetermined digital states of the sampled pulses appearing at the outputs, and
b. the output of said at least one Exclusive-OR gate connected to the first input of said flip-flop.

31. A system as claimed in claim 30 wherein:
a. said at least one Exclusive-OR gate is a plurality of Exclusive-OR gates,
and said comparing means further comprises:
b. a gate connected between the outputs of said plurality of Exclusive-OR gates and the first input of said flip-flop.

32. A system as claimed in claim 28 wherein:
a. said sampling means is a digital delay line with the pulse train applied to the input of the delay line, and
b. said plurality of outputs are outputs spaced evely along the delay line.

33. A system as claimed in claim 32 wherein:
a. said comparing means includes at least one Exclusive-OR gate selectively connected to the outputs of said digital delay line to determine whether there is an occurrence of the predetermined digital states of the sampled pulses appearing at the outputs.

34. A system for distinguishing between voice, data, and noise signals in a communication line or the absence of signals therein, comprising:
a. means for providing a pulse train in response to excursions from a predetermined amplitude level in the signals spplied to said communication line,
b. means for providing timing pulses at a varying rate, c. means connected to receive the pulse train and timing pulses for sampling the pulse train at a varying rate in response to receipt of said timing pulses and retaining temporarily the pulses which are sampled, d. means for selectively comparing the pulses retained in said sampling means during the sampling of the pulse train to determine whether there is an occurrrence of predetermined digital states of the selected sampled pulses, said pulse comparison occurring repetitively, e. means for measuring the occurrences of said predetermined digital states of said selected sampled pulses as determined by said comparing means, f. a digital filter responsive to the output of said pulse train providing means for producing a signal having one or the other of two binary states as determined by the presence or absence, respectively, of a signal on said communication line, g. three output lines individually actuatable to provide an output indicative of the presence of voice signals, the absence of signals, or either one or the other of said noise or data signals, h. means responsive to the digital state of the signal produced by said digital filter for individually actuating said output lines, and i. means responsive to said measuring means and the output of said actuating means for indicating the presence of data or noise in the communication line as determined by a predetermined magnitude of occurrences of predetermined digital states of said selected sampled pulses and said actuating means having actuated the output line indicative of the presence of noise or data.

35. A system as claimed in claim 34 wherein:

a. said means for providing timing pulses comprises a variable frequency oscillator for generating timing pulses at a rate which varies between predetermined lower and upper limits.

36. A system as claimed in claim 35 further comprising:

a. a timer for establishing a sampling period of predetermined duration, and b. means for setting said variable frequency oscillator at one of said predetermined limits at the start of each sampling period.

37. A system as claimed in claim 36 wherein:

a. said variable frequency oscillator is a voltage-controlled oscillator, and b. said setting means is a ramp voltage generator which sets said voltage-controlled oscillator at its lower rate limit at the start of each sampling period and drives said oscillator toward its upper rate limit for the duration of the sampling period.

38. A system as claimed in claim 35 wherein:

a. said sampling means has a plurality of outputs on which the sampled pulses appear, and b. said comparing means selectively compares the sampled pulses appearing at the outputs of said sampling means.

39. A system as claimed in claim 38 wherein:

a. said sampling means comprises a plurality of serially-arranged shift registers with the pulse train applied to the first shift register in the series, and the timing pulses applied as clock inputs to each shift register, and b. said plurality of outputs include at least one output connected to each shift register.

40. A system as claimed in claim 36 wherein said actuating means comprises:

a. three channels, each of said channels being connected to one of said output lines, b. means for applying the output of said timer to said actuating means, c. two of said channels being directly responsive to the binary state of the signal produced by said ditital filter and to the output of said timer to actuate the output lines indicative of the absence of signals or the presence of either one or the other of said noise or data signals, and d. the third channel being responsive to the output of said two channels and to the output of said timer to actuate the output line indicative of the presence of voice signals.

41. A system as claimed in claim 40 wherein:

a. said two channels both include a pair of flip-flops connected in tandem, the first flip-flop in both channels connected to be directly responsive to the binary state of the signal produced by said digital filer, and b. said third channel connected to be responsive to the output of the second flip-flop in both of said two channels.

42. A system as claimed in claim 41 wherein said indicating means includes:

a. a pair of coindicence gates having:

1. first inputs connected to the output line on which is applied an output indicative of the presence of noise or data signals, and
2. second inputs, the second input of one of said coincidence gates being connected to said measuring means, and the second input of the other of said coincidence gates being connected to be responsive to the output of said one of said coincidence gates.

* * * * *